(12) United States Patent
Bach et al.

(10) Patent No.: US 6,628,808 B1
(45) Date of Patent: Sep. 30, 2003

(54) APPARATUS AND METHOD FOR VERIFYING A SCANNED IMAGE

(75) Inventors: George Bach, Plymouth, MN (US); Dean R. Nichols, Hugo, MN (US); Brian P. Johnson, Eden Prairie, MN (US)

(73) Assignee: Datacard Corporation, Minnetonka, MN (US)

( * ) Notice: Subject to any disclaimer, the term of this patent is extended or adjusted under 35 U.S.C. 154(b) by 0 days.

(21) Appl. No.: 09/362,197

(22) Filed: Jul. 28, 1999

(51) Int. Cl.[7] .................................................. G06K 9/00
(52) U.S. Cl. ...................... 382/115; 382/137; 382/181; 382/217; 382/306; 382/321; 235/380; 705/44
(58) Field of Search ................................ 382/100, 112, 382/115, 116, 119, 124, 137, 141, 151, 165, 181–184, 199, 204, 209, 210, 217–218, 274, 287, 291, 305, 306, 312, 321; 235/375, 380, 382, 448, 494; 358/1.3, 1.4, 1.14, 3.28, 3.29, 403; 705/41, 44

(56) References Cited

U.S. PATENT DOCUMENTS

| | | | |
|---|---|---|---|
| 3,611,292 A | 10/1971 | Brown et al. ............... 235/380 |
| 3,612,833 A * | 10/1971 | Davis .......................... 235/448 |
| 3,760,162 A | 9/1973 | Holter ......................... 235/455 |
| 3,774,015 A | 11/1973 | Lockard ...................... 235/448 |
| 3,903,503 A | 9/1975 | Dilllingham et al. ........ 382/182 |
| 3,930,141 A | 12/1975 | Koyama et al. ............. 382/104 |
| 3,937,928 A | 2/1976 | Sasaki et al. ................ 235/454 |
| 3,939,327 A | 2/1976 | Humphrey ................... 382/321 |
| 4,020,327 A | 4/1977 | Geary et al. ................. 235/454 |
| 4,628,195 A | 12/1986 | Baus ............................ 235/440 |
| 4,700,078 A | 10/1987 | Mizuno et al. .............. 250/566 |
| 4,724,307 A * | 2/1988 | Dutton et al. ............... 235/455 |
| 4,783,823 A * | 11/1988 | Tasaki et al. ................ 382/116 |
| 4,845,770 A | 7/1989 | Koshida ....................... 382/321 |
| 5,050,231 A | 9/1991 | Watanabe et al. ........... 382/259 |
| 5,122,813 A * | 6/1992 | Lass et al. ................... 347/225 |
| 5,151,582 A | 9/1992 | Fujioka ....................... 235/469 |
| 5,331,443 A * | 7/1994 | Stanisci ........................... 359/2 |
| 5,410,642 A * | 4/1995 | Hakamatsuka et al. .... 358/1.14 |
| 5,433,807 A * | 7/1995 | Heckenkamp et al. ...... 156/230 |
| 5,602,378 A | 2/1997 | Vaarala ................... 235/462.08 |
| 5,757,382 A | 5/1998 | Lee ............................. 345/441 |
| 6,085,976 A * | 7/2000 | Sehr ............................ 235/384 |

FOREIGN PATENT DOCUMENTS

| | | |
|---|---|---|
| EP | 0 720 115 A2 | 7/1996 |
| JP | 08 185481 | 7/1996 |
| WO | WO 99/17102 | 4/1999 |

OTHER PUBLICATIONS

Takafumi (Computer translation of Japanese Patent No. 08–185481), pp. 1–13.*

Aden, S. et al., "Document Format Selection And Control Process", *IBM Technical Disclosure Bulletin*, vol. 26, No. 9, pp. 4718–4719 (Feb. 1, 1984).

Bohner, M. et al., "Ein Messautomat zur Ermittlung der Druckqualität von Schriftzeichen", *Elektronische Rechenanlagen*, vol. 6, pp. 280–286 (1976).

Bushaw, K. et al., "Bad Pel Detection and Correction" *IBM Technical Disclosure Bulletin*, vol. 24, No. 11B, pp. 5898–5899 (Apr. 1982).

"Optical Recognition of Embossed or Depressed Characters", *NEC Research And Development*, No. 29 pp. 86–88 (Apr. 1973).

* cited by examiner

*Primary Examiner*—Daniel G. Mariam
(74) *Attorney, Agent, or Firm*—Merchant & Gould P.C.

(57) ABSTRACT

An apparatus and method capable of verifying a scanned image utilizing a verification algorithm based on a topological analysis of the scanned image and an apparatus and method capable of verifying a scanned image utilizing a verification algorithm based on an improved bi-level separation analysis incorporating an anti-stroke scoring method with a character outlining method.

43 Claims, 5 Drawing Sheets

CHARACTER TEMPLATE /50

```
A    .    0
B    .    1
C    .    2
     W
     X
     Y
     Z
```
51 → B

PERSONALIZATION DATA /52

| COORDINATE | CHARACTER |
|---|---|
| X0,Y0 | B |
| X1,Y1 | 0 |
| X2,Y2 | 0 |
| X3,Y3 | 1 |
| X4,Y4 | – |
| . | . |
| XN,YN | r |

53 → COORDINATE   CHARACTER ← 55

SCANNED DATA /54

| COORDINATE | CHARACTER |
|---|---|
| X0,Y0 | B |
| X1,Y1 | 0 |
| X2,Y2 | 0 |
| X3,Y3 | 1 |
| X4,Y4 | – |
| . | . |
| XN,YN | r |

57 → COORDINATE   CHARACTER ← 59

APPARATUS AND METHOD FOR VERIFYING A SCANNED IMAGE

BACKGROUND

There is a need in the Optical Character Verification (OCV) industry for an OCV apparatus and method with increased reliability of verification of each character or image scanned into a computer system.

Specifically, there is a need for an OCV method that is different from traditional Optical Character Recognition (OCR) and OCV algorithms. Traditional algorithms are based on analysis of pure bi-level images. Bi-level images contain only two colors or two levels of intensity. Typically these are visualized as black-and-white images. Everything is black (one level) or white (the other level). There exist no in-between levels. Furthermore, traditional OCR and OCV approaches rely mainly on statistical analyses of the foreground pixels of the scanned image.

An example is the case of OCR of black text on white paper. When these types of documents are scanned (or whenever these images are otherwise obtained in computer format), a gray-scale image is normally obtained. The gray-scale image has no "color," but rather contains varying intensities of gray. White is represented as a very bright gray, black is represented as a very dark gray. There are many intermediate levels of gray between these two extremes. It is well known in the art how to convert the raw gray-scale image into a bi-level form by choosing a cutoff value. All pixels which have an intensity that is greater than the cutoff are made white (the brightest possible gray-scale intensity) and all other pixels are made black (the darkest possible gray-scale intensity).

A "Gray-Scale Card Image" is an image of a card that is scanned with any conventional scanning system that is generally commercially available (e.g. an UltraChek I system). Also, executing an intensity normalization algorithm to a card makes the card image visually appear slightly better than the raw UltraChek I scanned image. However, it does not fundamentally affect the character image processing.

The card image has varying intensities of gray on it. Although the card background is not quite perfectly white, it is generally close to being perfectly white, with a few scattered gray pixels throughout. Heavy characters appear as a very dark gray, with intermediate intensities of gray appearing near their edges. Small characters will appear significantly lighter in intensity that the large characters. This effect is normal and is predominantly due to the resolution of the camera used for scanning the card image. Also, neighboring pixels will generally contribute part of their intensity to a central pixel, resulting in an intensity smearing effect.

A histogram of the pixel intensities for the gray-scale card image is illustrated in FIG. 1. The white background accounts for most of the pixel data of the scanned image. This is indicated as the large spike 20 centered around the 220 mark. Moreover, the spike is so large that it is off the scale. There is also a large spike 22 around the 0 mark accounting for the majority of the black text that appears on the source card. In addition, minor spikes of intermediate intensities are registered as the pixels fade from the full black color of the text to the full white color of the background.

The image represented by the histogram may be converted to a black and white image by choosing an appropriate cutoff value (e.g. 128). Choosing the appropriate cutoff value and marking all intensities above the cutoff as white, all others as black, yields a bi-level, black and white, image.

This technique enables the OCR algorithm to easily recognize the larger characters. However, since many of the smaller characters will become significantly distorted, the OCR algorithm will not be able to accurately recognize these characters. One contributing factor to the quality of the bi-level image is the distortion introduced by the UltraCheck-I image capturing system. The image capturing system tends to blend pixels together, such that physically adjacent pixels on the card actually contribute to logical pixels in the resultant scanned image. For example, the dots used to form the colon characters on the small text will be distorted in intensity by the background pixels that surround them. The blending effect results in fuzzy cutoff values between foreground and background pixels. The distortion can be somewhat reduced by evaluating the pixel intensity histogram in the immediate vicinity of the character itself, rather than making the cutoff decision by considering the entire card.

Regardless of the approach, whenever a cutoff value is used, there typically exists a significant noticeable distortion in the character images once they are converted to bi-level format. However, for a solid color text printed on a solid color background, the bi-level form of the image is typically adequate for a person to recognize the characters.

Once the bi-level form of the image has been created, conventional character processing algorithms will attempt matching the character images that appear on the source image (e.g. the card) with a set of reference character images (e.g. a reference template of characters or images stored in the memory circuits of a computer). Character matching is based on some correlation between the source and reference images. Several different correlation approaches are used by conventional software programs.

In many cases, conventional software programs attempt to isolate individual characters appearing on the source image. This produces a series of discrete character images that may be individually processed. There are other systems that operate based on recognizing larger sequences of characters, not just recognizing one character at a time. However, the majority of software programs operate on one character at a time.

At this point, there is a divergence in the approaches taken by conventional OCR and OCV software programs. Conventional OCR software programs recognize the text without having knowledge of what text should actually be present, whereas conventional OCV software programs verify the text according to a known set of text data.

Typically, OCR software programs operate on a substantial amount of text (e.g. a printed page). Accordingly, the OCR software program must read all the characters on a page fairly quickly. It cannot spend a lot of time on any single character. In contrast, OCV software programs typically operate on a very short string of text (e.g. a dozen characters) and it generally knows what text is supposed to be present at a particular character coordinate location. Therefore, the OCV software program can spend more time analyzing individual characters than the OCR software program can.

Once an OCR software program isolates an individual source character, some type of comparison is made between the scanned character from the source image and a reference character image stored in the memory of a computer, or controller. The comparison is often performed in the frequency domain, rather than in the spatial domain, using the Fourier transform or other similar frequency transformations to convert the scanned image into a frequency domain representation. Character images typically exhibit less variance in appearance when transformed into the frequency domain rather than the spatial domain. Therefore, individual missing pixels are not as relevant in the frequency domain. Therefore, the matching process is able to occur more quickly and reliably.

Although frequency domain comparisons of character images are common and well known in the art, there exists some systems that use spatial comparison techniques. These techniques include computing basic characteristics about the source character image, such as the number of connectors, the number of closed curves, etc. The comparisons are then used to narrow the source characters to a reasonable set of characters that may actually be present in the source image. Subsequently, a statistical match is then performed on the individual pixels to actually recognize the set of scanned characters.

In both frequency domain and spatial domain comparison cases, there are many ways of implementing the comparison logic. Neural nets as well as conventional algorithmic type software programs are commonly used. Neural nets are "trained" systems that are fed numerous sample images. However, neural nets are not very predictable in how they will actually perform in real life. The neural nets must be trained. If the training is successful, the system is then tried at actually recognizing real characters. The precise layout of the nodes of the neural net is critical because they comprise the trained parameters. Since neural nets are extremely sensitive, it is difficult to predict how well they will perform on variations of a given set of inputs (e.g. switching to different fonts).

The algorithmic approaches involve developing software programs (or code) to perform the character recognition function. There is no "magic black box" that figures out exactly what an algorithmic character recognition software program is doing. As such, it may often misinterpret character images.

OCV is typically performed in the spatial domain. Comparison of character images is performed in a manner similar to the way a person would do it. For example, a scanned character image is compared against a reference image (e.g. a template in memory). Subsequently, some type of statistical correlation between the two is performed to determine whether the characters match. The operation is similar to the method used by OCR software to compare characters in the spatial domain. However, since OCV is typically performed on smaller sets of characters and has more time available for analyzing characters, more computationally intensive algorithms may be used to perform the OCV function.

There are several problems that conventional OCR and OCV systems are unable to overcome. First, images that are more complex than simple black text on white paper are inherently harder to recognize or verify because there is a sharp division between the foreground and the background. There is no practical method of resolving a source gray-scale image into a simple bi-level image. Second, if images are set on very complex backgrounds it is difficult to separate the text pixels from all the other pixels in the image. In many cases, the pixels in the source image foreground and background are so close in color and intensity that it is virtually impossible to obtain a good separation between the foreground and the background elements. If a black and white representation of the image clearly separating the character (foreground) data from the background data cannot be obtained, the conventional recognition and verification approaches cannot be applied.

Without a clean separation between foreground and background elements, jumping into the frequency domain will not yield predictable results. Addition, the presence of extraneous lines in the image presents significant problems for any conventional OCR system. The extraneous lines that are misinterpreted as being part of the character itself will likely confuse the OCR or OCV systems.

Another problem that must be overcome is resolving the defects introduced by the imaging system. For example, conventional imaging systems significantly distort the card image. In particular, blending of pixel intensities over a large area. The foreground pixels to be scanned are significantly distorted near the edges of the characters by the imaging system. For example, given a dark foreground and a bright background, the pixels near the edges of the characters will show up brighter than they should be because of the blending effect. Scanning the image using a higher resolution camera that crisply defines pixel boundaries will help the recognition process significantly. However, this option may not always available.

For the foregoing reasons, there is a need for an apparatus and method capable of verifying a scanned image utilizing an image verification algorithm based on a topological analysis of the scanned image. There is also a need for an apparatus and method capable of verifying a scanned image using an improved bi-level separation method that incorporates an anti-stroke scoring method with an image outlining method (e.g. a method of analyzing an image area disposed outside of the image's defined outer boundary to determine how many "stray" pixels exists there).

SUMMARY

To overcome the limitations of the related art described above, and to overcome other limitations that will become apparent upon reading and understanding the present specification, the invention is directed to an apparatus and method capable of verifying a scanned image utilizing a verification algorithm based on a topological analysis of the scanned image. The invention is also directed to an apparatus and method capable of verifying a scanned image utilizing a verification algorithm based on an improved bi-level separation analysis incorporating an anti-stroke scoring method with a character outlining method.

One aspect of the apparatus having features of the invention includes an image verification apparatus for verifying images. The apparatus comprising an illumination source, an image scanner, scanning an image and converting the image illuminated by the illumination source into an electronically readable format. The apparatus also includes a computer executing a program, a storage device for storing the electronically readable scanned image in an array of discrete elements of varying intensity having first and second boundaries and a principal portion therebetween. The apparatus also includes a programmable template capable of storing a predetermined image in a separate portion of the storage device, and image recognition logic for verifying the scanned image against the predetermined image.

Another aspect of an apparatus having features of the invention includes a scanned image verification apparatus for verifying scanned images. The apparatus comprising a computer executing a program, a storage device for storing an electronically readable scanned image in an array of discrete elements of varying intensity having first and second boundaries and a principal portion therebetween. The apparatus also includes a programmable template capable of storing a predetermined image in a separate portion of the storage device and image recognition logic for verifying the scanned image against the predetermined image.

A further aspect of an apparatus having features of the invention includes a card manufacturing apparatus for putting indicia on a card and verifying the indicia. The apparatus comprising a plurality of card processing modules arranged to produce a card with indicia disposed thereon and at least one of the modules is an indicia verification module using a varying intensity scanned image of a portion of the card.

An aspect of a method having features of the invention includes a method for verifying a scanned image. The method comprising, scanning an image, converting the scanned image into an electronically readable format, storing the scanned image as an array of discrete elements of varying intensity, and analyzing the array of discrete elements of varying intensity against a predetermined image.

Yet another aspect of an article of manufacture having features of the invention includes a computer program on a storage medium. The article of manufacture comprising a programmable template capable of storing a predetermined image in a storage device and image recognition logic for verifying an image against the predetermined image. Yet a further aspect of a method having features of the invention includes a computer system having a first personalization data base, the first data base including card image data and coordinates identifying the location of the card image data, a second template data base, the second data base including data for identifying image, and a third database, the third database including scanned image data and coordinates identifying the location of the scanned data on the card. The method for verifying the scanned image on the card comprising loading a first personalization data base from a storage device to a first area of memory in a computer; loading a second template data base from a second area of memory in the computer; loading a third scanned image data base into a third area of memory in the computer; and verifying that the scanned image data obtained from a card at a first coordinate location matches the personalization data identified at the coordinate location according to the second template data.

These and various other features of novelty as well as advantages which characterize the invention are pointed out with particularity in the claims annexed hereto and form a part hereof. However for a better understanding of the invention reference should be made to the drawings which form a further part hereof, and to accompanying descriptive matter, in which there are illustrated and described specific examples of an apparatus and method in accordance with the invention.

BRIEF DESCRIPTION OF THE DRAWINGS

These and other features, aspects and advantages of the invention will become better understood with regard to the following description, appended claims and accompanying drawings, where:

DESCRIPTION

In the following description of the specific embodiment, reference is made to the accompanying drawings which form a part hereof, and in which are shown by way of illustration the specific embodiments in which the invention may be practiced. It is to be understood that other embodiments may be utilized as structural changes may be made without departing from the scope of the present invention.

The embodiments of the invention described herein are implemented as a scanned image verification apparatus and method capable of verifying scanned images according to a topological approach and a bi-level separation with image outlining approach.

Figure 1:
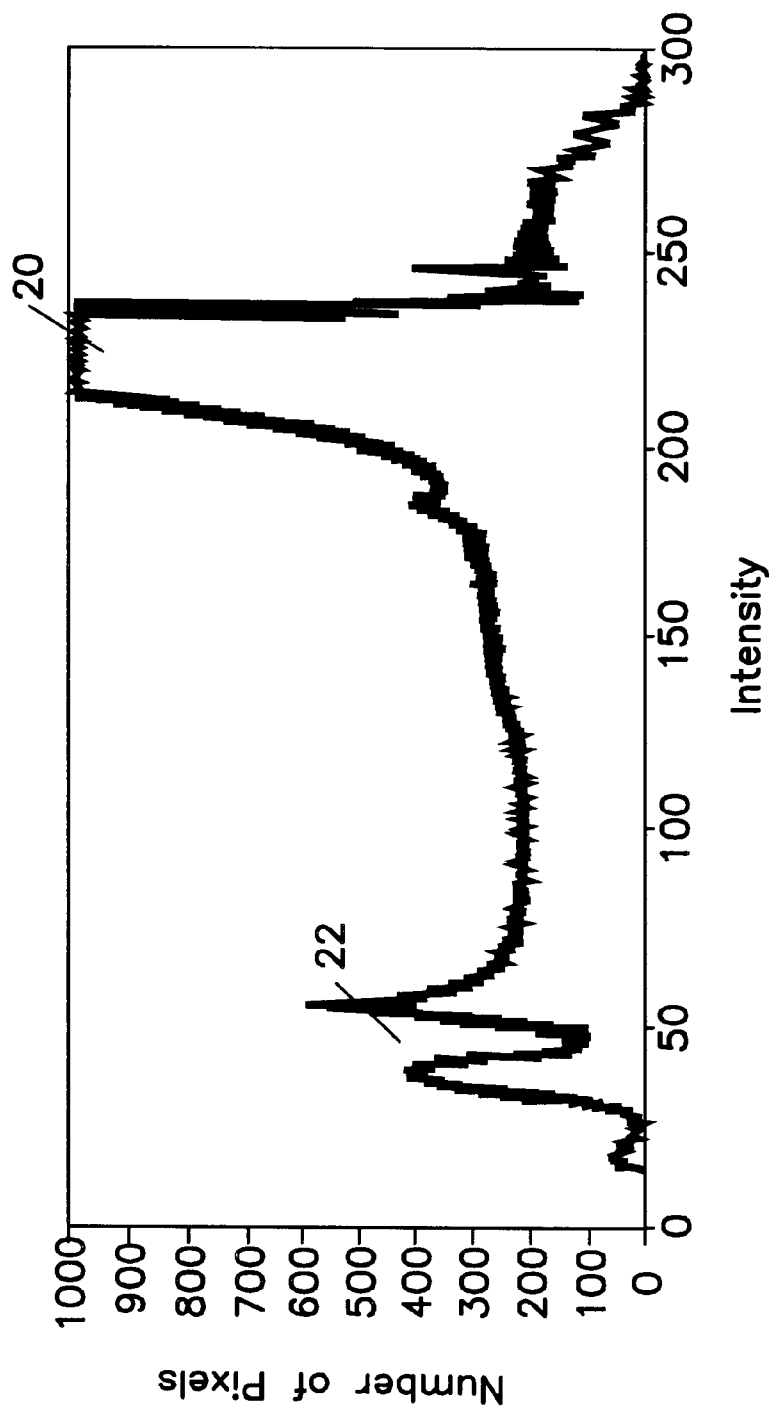
FIG. 1 is a histogram of a pixel intensities of a scanned image.

Referring now to FIG. 1, a histogram of an intensity scan of a cad is shown. The histogram is utilized to determine what portions of the scanned image or characters pertain to the foreground and which pertain to the background. Since the card used to generate the histogram contains a predominantly white background most of the pixel data is white. This is shown as the large spike 20 at the 220 intensity mark. The spike 22 accounts for the black text on the card.

Figure 2:
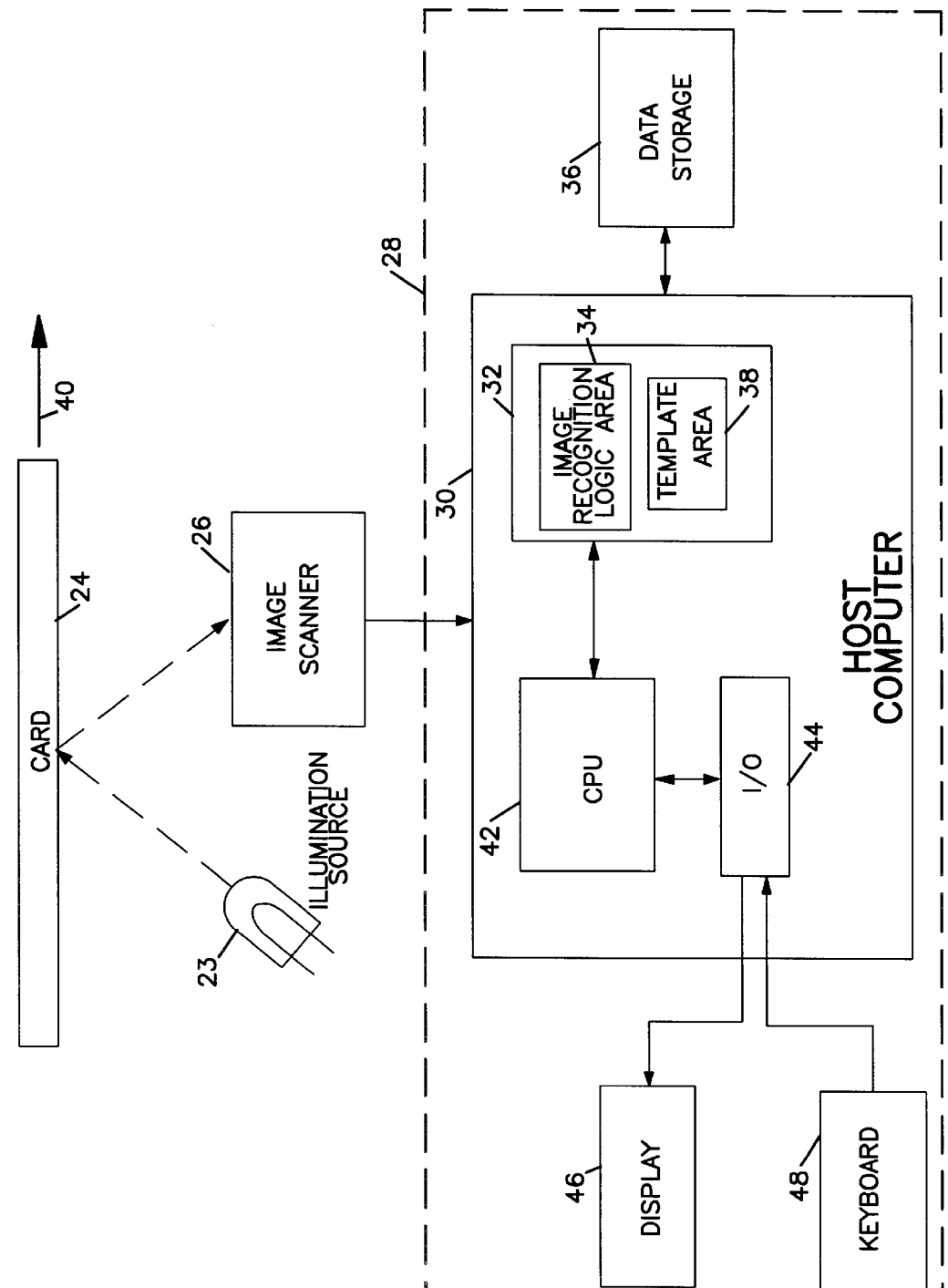
FIG. 2 is a diagram of the environment that is used to implement one embodiment of the invention.

FIG. 2 is a diagram of an image scanning and verification system used to practice one embodiment of the invention. The card 24 moves on a conveyor or other transport system in the direction 40. An illumination source 23 illuminates the card 24 while an image scanner 26 captures light reflected from the card 24 and converts it into a computer readable format. The illumination source 23 is typically comprised of one or a plurality of light emitting diodes (LEDs). However, those skilled in the art will appreciate that other illumination sources may be substituted without departing form the principles of the invention.

The image scanner 26 outputs digitally formatted data representing a full gray-scale image of the card. The gray-scale data is stored in a storage device 36 of the scanning computer system 28. The scanned data is transferred from the data storage device 36 to memory the host computer 30. The algorithm for verifying the scanned data executes in a section of memory 32 allocated to the image recognition logic 34. In another section of memory a template area 38 is reserved for loading the character or image template to guide the algorithm.

The host computer 30 generally includes a central processing unit 42 and basic input/output 44 (I/O) function. Information is entered into the host computer 30 via the keyboard 48, or other input device such as touch screen, mouse or the like. A terminal such as a video display 46 is provided for viewing output generated by the scanning computer system 28.

The scanned in character image is represented of a in the form of an intensity plot. The image represents the intensity of light reflected by embossed characters on a card versus the background of the characters (e.g. the rest of the card).

In other words the characters are represented in terms of intensity. The raised embossed characters that are typically found on the card 24 appear as a lighter intensity than the rest of the card 24. The area immediately around the characters is generally darker and represents the card's background.

The intensity of the light reflected by a portion of the raised embossed surface of the character is represented by the height of an intensity spike at that particular pixel location. Note that the text itself may appear brighter than the surrounding background mainly because the surface of the raised embossed character is closer to the light source and reflected light detection system than the background is.

Also, the raised surface of the embossed character tends to be a slightly lighter shade of color relative to the background in the immediate vicinity of the character. Accordingly, immediately around the raised outline portion of the characters there are deep valleys. However, at a distance further away from the text itself, the pixels become bright again. High spots on the intensity graph represent brighter pixels, while low spots represent darker ones.

An intensity graph may also illustrate the effects of the dark diagonal lines that may appear on the character intensities. For example, a "4" and a "0" have noticeable depressions at the locations where the lines cross the characters. The embossed text is normally found on a credit card or the like. The embossed text is raised up on a top side of the card. The card is then topped with a colored foil. Since embossing actually deforms the plastic card itself where the characters are punched out from a bottom side of the card, there is always a significant difference in color around the edges of the characters.

Figures 3A, 3B, 3C, 3D:
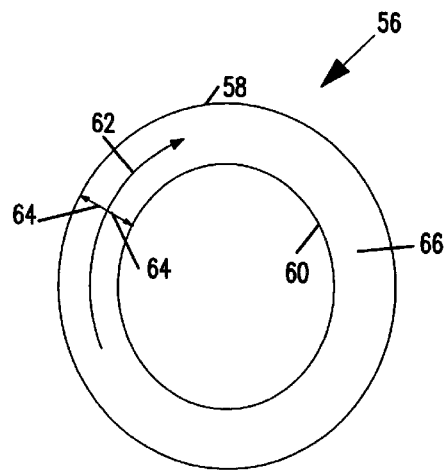
FIG. 3A is a diagram of character template data base.
FIG. 3B is a diagram of personalization data base.
FIG. 3C is a diagram of a scanned data, data base.
FIG. 3D is a schematic diagram of a topological method for analyzing a scanned character according to one embodiment of the invention.

FIG. 3A illustrates a character template data base 50 that is used to store a template of characters 51 that are expected to be found on the card 24. The character template data base 50 stores the character's form to be loaded into the template area 38 of the computer's 30 memory circuits 32. The template provides a guide for the algorithm such that it can follow a known contour or outline of the character that it is attempting to verify.

FIG. 3B illustrates a personalization data base 52 that is used to store the card carrier's personal information such as name, card number, etc. The personalization data base 52 includes the X-Y coordinates 53 of where a particular character 55 is supposed to be located on the card 24. The personalization data base 52 provides the image scanning computer 28 the information that it is attempting to verify exists on the card 24. The X-Y coordinate 53 identifies where a particular character 55 appears on the card 24.

FIG. 3C is a scanned data, data base 54 used to store the gray-scale image data of the scanned card 24. Once the algorithm loads a coordinate 53 and character 55 from the personalization data base 52 into a memory area 32 in the computer system 30, it will load the corresponding appropriate template of that character 51 from the character template data base 50. The algorithm then traces the corresponding character 59 at coordinates 57 from the scanned data, data base 54 according to the template character 51 to verify that it matches the character 55 at the coordinate 53 that is stored in the personalization data base 52.

I. Topological Approach

Rather than using the conventional approach of differentiating between the foreground and the background, the apparatus and method of one embodiment of the present invention, utilizes a topological approach to analyze and verify the scanned card image.

According to one embodiment of the invention, an image verification algorithm is based on a topological analysis of the image. Standard recognition software relies on getting crisp bi-level separation between the foreground and the background of the image. However, the verification system according to one embodiment of the invention eliminates this step by performing a topological analysis based on a full gray-scale version of the scanned image.

Considering the scanned image of a conventional credit card any diagonal lines that may exist in the source image will significantly affect the scanned image quality of the characters embossed on the card. This effect is produced by the imaging system since any dark diagonal lines will have an effect on the intensity of each scanned character.

Referring now back to FIGS. 3A–D, in the various embodiments of the invention described herein, the scanned text data 54 appearing on the card is verified against the known set of personalization data 52 and the reference template of data 50. For example, the text that is supposed to be on the card such as the card carrier's name, card number, expiration data, and other personalization information is stored in the data file 52 in the memory 32 or data storage device 36 of the scanning computer system 28.

Furthermore, the character template data file 50 utilized by the verification algorithm is also stored in the memory 32 or data storage device 36 of the scanning computer system 28. Therefore, the text to be verified is known and is used to ensure that the proper information has been placed (e.g. embossed) on the card 28. Of course those skilled in the art will appreciate that text or images may be placed on the card 24 by various means other than embossing. For example, text may be placed on the card 24 by printing, etching, engraving, laser engraving, or other similar processes, without departing from the principles of the invention. Regardless of the method used to apply indicia such as text or images on the card by the various processes described above, embossed cards are generally topped with a colored foil.

FIG. 3D illustrates a character "0" 56 having a principal portion 66 between a first boundary 58 and a second boundary 60 and a first and second side 64 along a principal tracing path 62. The topological approach uses an algorithm that logically traces the contour of the scanned image 56 along the direction 62. The algorithm logically traces the path 62 of the character 56 along the principal portion of the character 66 (e.g. within the boundaries 58 and 60), verifying that changes in intensity along the tracing path 62 are sharper to either side of the tracing path 64 than they are along the direction of the tracing path 62.

At each predefined point along the logical tracing path 62 the algorithm tracks a character match score. In other words, the algorithm evaluates a score based on the intensity transition of adjacent pixels along the principal logical tracing path 62 versus intensity transitions of pixels to either side of the current position 64 just beyond the character's first boundary 58 and second boundary 60. At each point along the path 62 where this is true a character matching score of the present character being analyzed is increased. As the algorithm proceeds along the path 62 it keeps a running score. The score is indicative of how well the scanned character matches the character that is supposed to be in that coordinate position on the card.

In addition, the algorithm keeps track of anti-strokes. Anti-strokes indicate that the algorithm found strokes where they should not have been. Intensity transitions that are steeper to the sides of the anti-strokes rather than along the tracing path counts against the character's score. The algorithm computes a score for each of the ten characters at each possible location within a search window and selects the one with the best score as being the "correct" recognized character. If any recognized characters do not match the actual characters based on the personalization data base 52, the card is rejected. In other words, the verifications fails if any characters do not match the character that is actually supposed to be at a certain coordinate location on the card.

The template of stored characters 50 is utilized by the algorithm such that the algorithm knows how to logically trace the character image 56. For example, for a character to be verified, the algorithm retrieves (loads) the value of the character 55 based on its X-Y coordinate 53 stored in the personalization data base 52. Since the algorithm now knows which character to verify, it retrieves (loads) the corresponding character's logical template 51 from the character template data base 50. The algorithm then retrieves (loads) the scanned character from the scanned data, data base 54. Accordingly, the value of the logical template 51 of the known character 55 guides the algorithm through the scanned image of the embossed character stored in the scanned data, data base 54. This is done to verify that the character 53 according to the personalization data base 52 was actually placed in the correct X-Y coordinate on the card 24, or to verify that a character has been properly embossed on the card 24.

For example, for the "0" character in the last digit of a "40," the shape or contour of the character is logically traced. The tracing process occurs along the direction of travel along the principal portion of the character (e.g. within the pixels representing the actual character). During the tracing process, the algorithm verifies that at each step along the tracing direction, there are sharp transitions in terms of pixel intensity to either side of the tracing path and not quite as sharp intensity transitions in forward tracing direction.

The topological approach is rather like walking along a path and always trying to remain level, avoiding having to climb up a cliff or descend down into a valley. Naturally, there will be some steps along the path having spurious and artificial irregularities, requiring that one take a step up or down. However, the path along the tracing direction 62 within the principal portion of the character 66, would be significantly smoother than cutting across the tracing path 64.

The topological approach utilizes the entire gray-scale intensity data available from the scanned image. No vital intensity data is discarded. This is in contrast to conventional OCR and OCV algorithms which discard data in trying to reduce the image to a bi-level format. In the topological algorithm, the actual character verification logic has full access to the entire gray-scale intensity data (e.g. all the bumps and valleys) that appear in the stored scanned source image. This method yields more reliable character verification results than do conventional systems.

Matching the scanned image characters 59 stored in data base 54 against a pre-recorded set of personalization data 52 requires the pixels disposed across the tracing path 64 of the scanned character image 56 be significantly different in intensity than the pixels along the principal tracing path 62 of the character 56. As long as this remains true, there will be sharp cliff-like structures to either sides of the first boundary 58 and the second boundary 60 of the character along the principal portion of the character.

Because the deformations created in the plastic card by the embossing process (without actually piercing the top side of the card) there is enough differentiation between the scanned intensity of the peaks and valleys of each character or image to acquire a scanned image having a discernible differentiation in intensities. This is true even in cases where the card topping color matches the background color. For example, although digits that are disposed in a hologram area of a credit card are nearly the same color as the hologram background they are printed on, there will nevertheless exist a very sharp transition region around the edges of the characters.

In cases where the card is printed, for example Ultra-Graphix printing, the color of the UltraGraphix text should be significantly different in color than that of the surrounding background colors around the vicinity of the text. For either UltraGraphix or embossed printing, the OCV according to the invention attempts to guarantee that sharp edges exist at the first boundary 58 and the second boundary 60 regions of the scanned character image 56.

The steps followed in the topological algorithm, according to one embodiment of the invention, are as follows:

(a) Select a color plane to operate in;

(b) Obtain the character that best matches each location; and (c) Verify that the best match matches with the actual character at each coordinate location.

Selecting a Color Plane to Operate In

The imaging system captures images in full 24-bit color (8 bits worth of data for each of the red, green and blue color planes). The algorithm selects a color plane to operate in treating it as a gray-scale image. (Note that the three color planes are not combined to make a composite gray-scale image.) The color planes must be independently tried since there may exist cases where colors would not necessarily be discernible if the color planes were merged into one composite gray-scale.

For example, if the card contains two colors and they appear as identical intensity levels in different color planes (e.g. a very dark blue and a very dark red on the card), merging these two color planes into a composite gray-scale image yield an indiscernible color plane image. Accordingly, operation in each of the three planes must occur independently of the other two color planes. If the first selected color plane does not reveal the text expected to be found, the second color plane is tried. If all three color planes fail to yield satisfactory results, the algorithm assumes that the card contains invalid data.

Obtaining the Character That Best Matches Each Location

This step includes executing the aforementioned topological recognition algorithm on all possible characters at each character position (e.g. at each coordinate location of each character on the card). The scanned character 59 at X-Y coordinate 57 in the scanned data, data base 54 that best matches the corresponding stored character 55 in the personalization data base 52 at the corresponding coordinate location 53 according to the stored template of that character 51 is the character that is ultimately assumed to be correct. In one embodiment of the invention, the algorithm verifies all possible of the specific font used. Of course, those skilled in the art will appreciate that this is arbitrary, as any number of characters, symbols, images and the like may be used without departing from the principles of the invention.

Verifying That the Best Match Matches With the Actual Character at Each Coordinate Location This step of the algorithm checks to ensure that the best character matched by the algorithm actually matches with the text that was expected to be found. There may be some tolerance setting allowed to help break close ties. For example, the personalization data base 52 indicates that a "1" should have been placed at the current coordinate location of the card 24. However, a "7" is equally likely to have been (or nearly equally likely) placed at that same character coordinate location in the string of characters to be verified. Since the expected character is actually a "1," some tolerance is required to accept that character as being valid even if the "7" receives a trivially higher matching score ranking based on the character matching score obtained during the verification process.

Intensity normalization is another feature of one embodiment of the invention. Intensity normalization is intended to make cards appear as if they were uniformly illuminated while they were being scanned. Since the physical illumination used in the UltraChek module is irregular, on a solid white card that has been imaged, the scanned image of the card is much brighter in the center rather than at its edges. However, after intensity normalization, the dark areas around the edges will generally disappear.

In one embodiment of the invention, the normalization correction is performed on a pixel-by-pixel basis. For each pixel, the appropriate correction parameters are independently calculated. This is a somewhat brute-force approach to the problem, requiring hundreds of thousands of parameters to be independently computed and applied to the scanned images. However, this approach offers the advantage that it will still work well if some minor lighting changes occur during the scanning process (such as when a portion of the illumination source goes bad). Individual variances in camera response at specific pixel locations are also masked out using the normalization approach.

Prior to performing the normalization process, black and white calibration references are obtained. These should be the darkest black and the brightest white possible attainable since the actual scanned images that fall outside of the range set by these reference targets are clamped to the most extreme values according to the references. This results in a loss of dynamic range.

For each pixel location on the scanned card image, a simple linear transformation is computed that converts the raw input pixel to a normalized output range. The imaging system according to one embodiment of the invention produces images with 256 levels of gray, therefore the output range is from 0 to 255.

For example, a pixel location that recognizes a black card as an intensity of 30, and the white card as an intensity of 250 may be mapped into the output range 0 to 255. Therefore, if a raw card scanned image intensity of 30 is obtained, it is mapped to a 0; accordingly an input of 250 will be mapped to 255; an input half-way between at 140 would be mapped to 128.

According to one embodiment of the invention, a formula for computing the corrected pixel intensity is as follows:

$$c = B + \frac{r-b}{w-b} * (W - B)$$

where:
  c is the corrected pixel intensity. This will always fall somewhere in our output range.
  r is the raw value.
  B black output value; this is the intensity level we assign to our blackest possible pixel in the output range.
  W white output value; this is the intensity level we assign to our whitest possible pixel in the output range.
  b black input value; this is the intensity level we received from imaging the black reference target.
  w white input value; this is the intensity level we received from imaging the white reference target.

The parameters of this formula are computed independently for each pixel location of the card scanned image.

In one embodiment of the invention intensity normalization may be performed utilizing a different logic. For example, allow for pixel light intensities that exceed the range of the reference cards without saturation. In practice, there exist cards that are brighter than the best bright (white) reference card available. Therefore, in one embodiment of the present invention, the code (logic) interpolates between the reference points of the pixels that fall between them, and extrapolates for pixels falling outside the reference bounds.

For example, as indicates in Table 1, the system is given the following inputs for the red color plane:

TABLE 1

| Bright Reference: | 240 |
|---|---|
| Dark Reference: | 40 |
| Bright Norm: | 245 |
| Dark Norm: | 10 |

The reference points are the actual intensity values received by the scanning system (e.g. the camera). The norm points are the desired normalized image (the output) outputs. Based on the two sample points. (Dark reference, Dark norm) and (Bright reference, Bright norm), the system interpolates and extrapolates the actual raw image data as follows:

Out=(Dark Norm)+(Bright Norm−Dark Norm)/(Bright Reference−Dark Reference)*(Raw−Dark Reference)

Or, in more conventional notation:

$y = y0 + (y1-y0)/(x1-x0)*(x-x0)$

Yielding, for this example:

$y = 10 + 235/200*(x-40)$

The results are shown in Table 2:

TABLE 2

| x (raw pixel intensity) | y (normalized intensity) |
|---|---|
| 35 | 4 |
| 40 | 10 |
| 100 | 80 |
| 240 | 245 |
| 245 | 251 |
| 250 | 256.75* |

In the previous approach discussed above, any input values outside the reference range would be clamped to the reference range. The same standard interpolation formula was used.

In the currently described approach, values are not clamped to the reference range. Rather, values lying outside the reference range merely result in extrapolation.

Note in the (*) case that the output value would have to be clamped to the maximum representable range in the numbering system used. In the above example, the maximum range would be 255 for normal 8-bit gray-scale color images (all pixels must be in the range 0 to 255).

II. Gray-Scale Based Bi-Level Separation With Outlining

Figure 4:
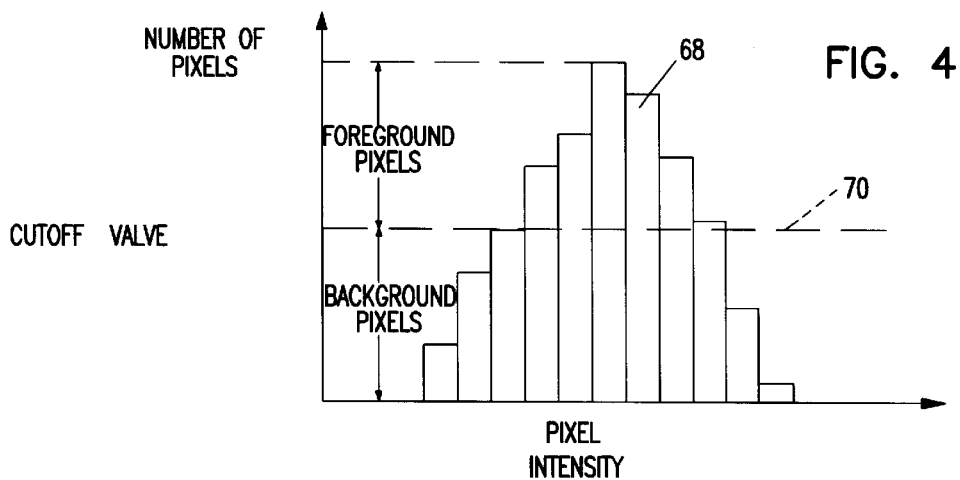
FIG. 4 is scanned character pixel intensity histogram.

Turning now to FIG. 4, in another embodiment of the invention, a bi-level image separation is generated to separate the foreground of the scanned image from the background. This is accomplished by generating an intensity histogram 68 and choosing a cutoff value 70. Accordingly, everything above the cutoff value 70 will be considered to be foreground pixels and everything below the cutoff value 70 will be considered to be background pixels.

At each candidate origin, for example the character that should appear at a particular coordinate of the source card 24 according to the stored personalization data 52, the character stroke is obtained from the stored character template data 50 and the pixels below it are analyzed. The histogram 68 of the pixel intensities is then constructed and used as the basis for the bi-leveling operation. As discussed above, all pixels having an intensity of some fraction of the intensity range of the template pixels are taken as foreground and all others are taken as background.

Figure 5A:
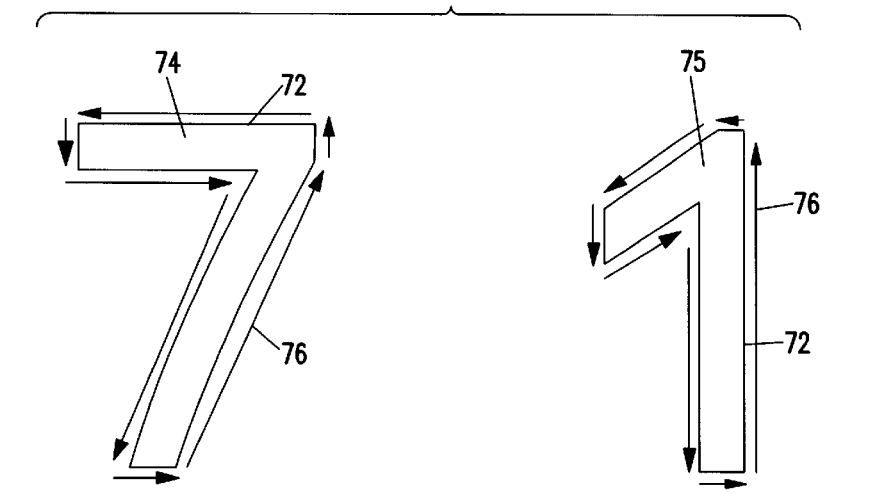
FIGS. 5A–B are schematic diagrams of a bi-leveling outlining method for analyzing scanned characters according to one embodiment of the invention.

Referring now to FIG. 5A, after the separation step, the algorithm logically traces the area outside of the character's outer boundary 72 along the tracing path 76 and counts the number of pixels that are have actually been classified as being "background" pixels based on the histogram cutoff value 70. The total number of pixels is used as one basis for verifying the character. For example, a well defined character with a clean outer boundary 72 (e.g. a clean edge) will have the fewest stray exterior pixels located outside of its outer boundary 72, therefore few of the exterior pixels will be marked as foreground pixels. The well defined characters will obtain a better overall score by the verification algorithm.

This method works well on a variety of backgrounds, simple as well as complex. However, a "speckled" or grainy background confuses the algorithm because the random pixels in the background area fall within the limits of the foreground intensity band. Also, characters that are the identical color as their background will not work as well if there is no distortion edge immediately around the character's outer boundary 72 that results from the embossing process. Although having a foreground color that exactly or closely matches the background color rarely occurs, it has been known to happen from time to time.

Figure 5B:
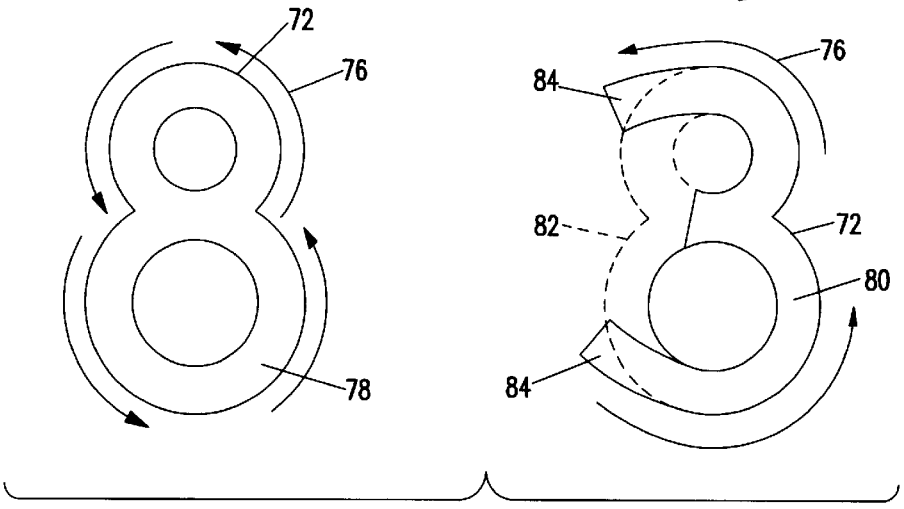

Turning now to FIG. 5B, the bi-leveling process is then combined with the anti-stroke scoring method employed by the "topological" method described above. The anti-stroke scoring method is employed to cover a few special cases where the bi-leveling algorithm attempts matching characters that are largely subsets of other characters (e.g. attempting to match an "8" character 78 when the actual scanned image contains a "3" character 80).

Since the bi-leveling algorithm logically traces the outline of the scanned image character just outside of its outer boundary 72, a subset character 80 will turn up a few mismatches in regions where the matching character's outline 82 crosses over the scanned image character 80. For example, in the case described above, if the algorithm is logically tracing the outline of the "8" character 78 but the scanned image is actually a "3" character 80, the algorithm will generate anti-stroke counts in the overlapping regions 84 where the two outer end portions of the "3" character 80 overlap the "8" character's 78 logical tracing path. However, there are generally only a handful of pixels that will result in mismatching that trigger anti-stroke counts.

Referring now to FIG. 5A, other special characters are the "7" character 74 and the "1" character 75. If properly offset, the "7" character 74 matches up well with most of the other digits in the font if it is properly offset. Since many origins are tried for a particular character, it is easy to end up with the "7" character 74 in a critical position where it appears to be the correct match for many of the other characters in the font set. For example, in a trial run of 121 cards with complex and simple backgrounds, 55 out of 97 mismatches were the "7" character 74 being misread as another character. In other words, over half of the errors involved the algorithm recognizing "7" character's 74 where there were none.

Incorporating the anti-stroke technique to the bi-leveling outline technique helps to eliminate this particular problem. It also helps to eliminate the special case where the color topping placed on the card matches the background color. Since the bi-leveling algorithm relies on a differentiating between foreground and background pixels, it will detect this occurrence by determining how many pixels in the search window are classified as background. The algorithm will be able to eliminate mismatches if it detects that some threshold of the foreground pixels have been crossed (e.g. more than 40% of the pixels in the search window are all being marked as foreground). If so the algorithm assumes that the character foreground matches the background.

III. Color Based Bi-Level Separation With Outlining

One embodiment of the present invention is based on the principle of matching all possible character templates against all possible character origins in a search window, and choosing the character template that best matches the actual image as the "read" character. If the read character matches the expected character, the test passes and evaluation proceeds on to the next character position.

In one embodiment of the invention, the set of character templates that are matched are combined into a font definition. For example, the font definition may be based on the principle that each character is of fixed width and height (all characters are identical in size). The character cell then indicates which pixels are on the centerline of the character. For example, the "0" character is represented as a rectangular array of pixels, background pixels are white, and the actual pixels that fall on the center line as one would draw the "0" are black. In addition, there is a gray-zone that marks pixels that are in no-man's-land (e.g. these are pixels that are not on the centerline, but which may not be background either).

The space character is a special character in the font because it is not given any actual image definition. However, the width of the character (in pixels) is specified. The space character is the only character that can be a different width than the other characters in the font. This enables the system of handling commonly used fonts, including variable pitched fonts. Variable pitched fonts generally have the same character width for each of the digit characters, even though the other characters are of different widths. This is generally done so that columns of numbers will actually line up on the printed page. Therefore, most variable pitched fonts can be handled using the principles of the present invention.

Variable pitched fonts may have a different width for digits versus the space character. Space characters are generally used to separate the digits in the account number disposed on the card. Accordingly, the width of the space character should be specified as part of the font definition.

The search window for a character is defined as a property of the font currently being used. Ideally, the precise position of the character placed on the card would be known, so that just one position on the card image needs to be checked to verify whether the character is correct. Naturally, there is some variation in character placement for different fonts.

The character placement tolerance is different for different methods of imprinting characters. For example, embossers have one tolerance, UltraGraphix have another and other methods will have their own placement inaccuracies.

When verifying a character, it is therefore necessary to look at multiple candidate locations for the character centered around the expected location. If the character is 5 pixels (the character can be 5 pixels, left, right, above, or below the expected location), there are a total of 121 possible locations for the character (5 to the left, 5 to the right, one for the center times the same set of locations for the vertical axis). The wider the tolerance, the more possible character locations must be inspected.

To score a character match at a given candidate location, the template is superimposed over the actual image. Those pixels on the actual image falling beneath the centerline pixels on the template are analyzed. These pixels are reference pixels. Ideally, all these pixels would be precisely the same color for the correct character template. If the system was expecting to read a "0" at the current character position, at best the system would see all the pixels making up the 0 character at the same exact color.

However, in reality, pixel colors are quite often very close for the centerline pixels on the correct character templates at the correct character positions. Color differences are often on the order of 5 or less for each of the red, green and blue color channels on a 0–255 scale.

Also, the pixels that are far from the centerline for a correct character match should be of significantly different color than the reference colors. Each pixel in the rectangular region of the current character template is compared to the reference pixels. If the test pixel is very close to one of the reference pixel colors, then that pixel is counted as foreground. Otherwise it is counted as background. The pixels far from the centerline should be part of the background.

To compute an actual score for a character match (a specific character template at a specific location on the card image), the number of pixels in the background of the template that actually show up as background colored pixels must be analyzed. The character with the largest percentage of background region pixels that are actually classified as background based on the comparison to the reference pixels is the character that is "read."

Note that there is a no-man's-land immediately surrounding the character centerline which is ignored when computing the score. These are pixels that are likely to be classified as foreground pixels, but they could be far enough away from the centerline of the character that they may not be. These are indeterminate boundary pixels that are completely ignored for this algorithm.

The determination of how close is close enough to classify a pixel as foreground is done statistically. For the reference set itself, the statistics are computed on the distances between the color samples. The distance is the Euclidean distance between color samples in "rgb" space.

The difference in the red, green and blue values is taken independently. The differences are then squared and summed. Finally the square root of the sum is taken to obtain the Euclidean distance as follows:

$$d = \text{sqrt}((r1-r2)\hat{\ }2 + (g1-g2)\hat{\ }2 + (b1-b2)\hat{\ }2)$$

The average distance between the reference colors is the basis for selecting a threshold. When analyzing the other pixels for a character cell, the system needs simply to find the closest reference pixel (in color), compute the distance and classify the pixel as foreground if it is within the selected threshold. Otherwise it is background.

Figure 6:
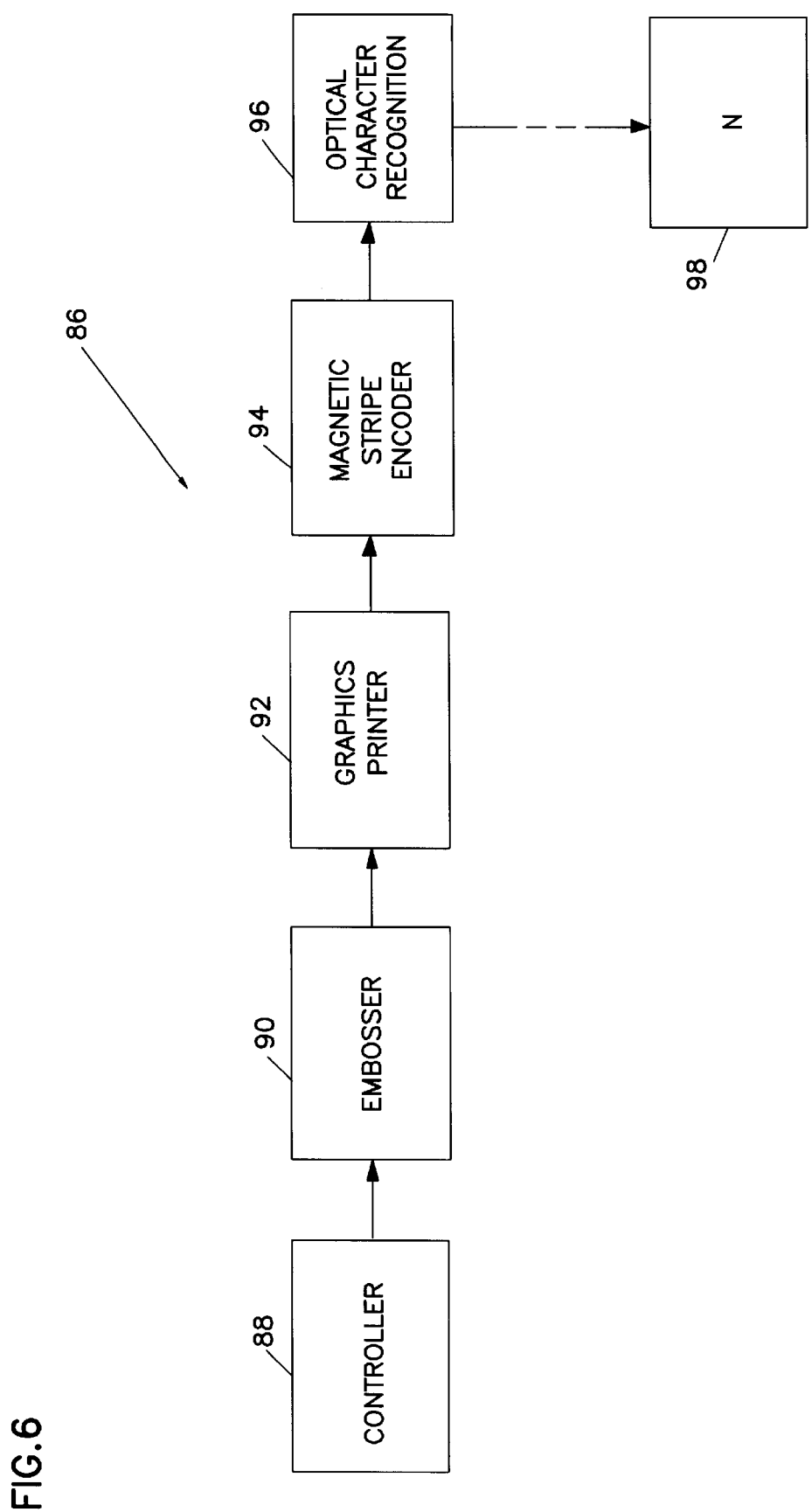
FIG. 6 is a block diagram of a card manufacturing apparatus including an image verification module according to one embodiment of the invention.

FIG. 6 illustrates a block diagram of a card manufacturing apparatus 86 comprises various modules for performing various function. For example in one embodiment, a controller 88 is provided for electronically controlling the various manufacturing functions of the apparatus including inputting and outputting the appropriate personalization data to be placed on a card and to be verified, respectively.

The controller 88 downloads the personalization data to be printed on the card to any one of or all of the following modules: the embosser module 90, the graphics printer 92, the magnetic stripe encoder 94, etc. Although these specific modules have been disclosed, they are limiting in that any modules capable of placing indicia on cards of various styles and formats could be substituted without departing from the principles of the invention.

Once the information has been placed on the card, the information must be verified by the optical verification module 96 which has been described herein. Furthermore, any number of additional modules 98 may be coupled to the card manufacturing apparatus either in series or parallel to perform other functions associated with placing indicia on a card and verifying those indicia against various databases of personalization data, reference template data and scanned data, data bases.

Although the invention has been described in considerable detail with reference to certain preferred versions thereof, other versions are possible. Therefore, the spirit and scope of the appended claims should not be limited to the description of the preferred versions contained herein.

What is claimed is:

1. An image verification apparatus for verifying images, comprising:

an illumination source;

an image scanner, scanning an image and converting said image illuminated by said illumination source into an electronically readable format;

a storage device for storing said electronically readable scanned image in an array of discrete elements of varying intensity having first and second boundaries and a principal portion therebetween;

a programmable template capable of storing a predetermined image in a separate portion of said storage device; and image recognition logic for verifying said scanned imsge against said predetermined image, wherein said image recognition logic logically verifies said scanned image by analyzing said array of discrete elements of varying intensity against said predetermined image, and wherein said image recognition logic provides intensity normalization on each element prior to performing said analysis of said scanned image, the intensity normalization of each element being performed according to the following formula:

$$c = B + \frac{r-b}{w-b} \times (W-B)$$

where:

c is a normalized element intensity value;

r is the raw value;

B is a black output value;

W is a white output value;

b is a black input value; and w is a white input value.

2. An image verification apparatus according to claim 1, wherein said analysis of said discrete elements of varying intensity further comprises:

logically tracing the contour of said array of discrete elements of varying intensity representing said scanned image along said principal portion in accordance with information obtained from a programmed template of said predetermined image; and along the tracing direction, verifying that the intensity of said elements along said first and second boundaries varies significantly from the intensity of said elements within said principal portion or said array of elements.

3. An image verification apparatus according to claim 2, wherein said image recognition logic computes a score for said scanned image based on the number of said elements along said first and second boundaries that vary significantly in intensity from the intensity of said elements within said principal portion of said array of elements.

4. An image verification apparatus according to claim 1, wherein said elements are pixels.

5. An image verification apparatus according to claim 4, wherein said pixels are stored in a gray scale format according to the pixel intensity.

6. An image verification apparatus according to claim 1, wherein said image recognition logic selects a color plane in which to operate prior to performing said analysis.

7. An image verification apparatus according to claim 6, wherein said color plane is any one of a red, green and blue color plane.

8. An image verification apparatus according to claim 1, wherein said illumination source further comprises light emitting diodes (LEDs).

9. An image verification apparatus according to claim 1, wherein said image scanner comprises a charge coupled device.

10. An image verification apparatus according to claim 1, wherein said image recognition logic logically verifies said scanned image by performing a bi-level separation of said scanned image and analyzing an area located outside of said scanned image area against said predetermined image area and background area.

11. An image verification apparatus according to claim 10, wherein said bi-level separation of said scanned image and analysis further comprises:

logically tracing a contour of said array of discrete elements of varying intensity representing said scanned image along a portion of said scanned image along a background area located outside of the area of said scanned image in accordance with information obtained from a programmed template of said predetermined image; and along the tracing direction, verifying that the number of background elements along said tracing contour is below a predetermined scoring threshold.

12. An image verification apparatus for verifying images, comprising:

an illumination source;

an image scanner, scanning an image and converting said image illuminated by said illumination source into an electronically readable format;

a storage device for storing said electronically readable scanned image in an array of discrete elements of varying intensity having first and second boundaries and a principal portion therebetween;

a programmable template capable of storing a predetermined image in a separate portion of said storage device; and image recognition logic for verifying said scanned image against said predetermined image, wherein said image recognition logic logically verifies said scanned image by analyzing said array of discrete elements of varying intensity against said predetermined image, and wherein said image recognition logic provides intensity normalization on each element prior to performing said analysis of said scanned image, the intensity normalization of each element being performed according to the following formula:

$$y = y0 + (y1-y0))/(x1-x0)*(x-x0)$$

where:
y is a normalized element intensity value;
x is the raw value;
y0 is a Dark Norm value;
y1 is a Bright Norm value;
x0 is a Dark Reference value; and
x1 is a Bright Reference value.

13. A scanned image verification apparatus for verifying scanned images, comprising:

a storage device for storing an electronically readable scanned image in an array of discrete elements of varying intensity having first and second boundaries and a principal portion therebetween;

a programmable template capable of storing a predetermined image in a separate portion of said storage device; and image recognition logic for verifying said scanned image against said predetermined image, wherein said image recognition logic logically verifies said scanned image by analyzing said array of discrete elements of varying intensity against said predetermined image and wherein said image recognition logic provides intensity normalization on each element prior to performing said analysis of said scanned image, the intensity normalization of each element being performed according to the following formula:

$$c = B + \frac{r-b}{w-b} \times (W-B)$$

where:
c is a normalized element intensity value;
r is the raw value;
B is a black output value;
W is a white output value;
b is a black input value; and
w is a white input value.

14. A scanned image verification apparatus according to claim 13, wherein said analysis of said discrete elements of varying intensity further comprises:

logically tracing the contour of said array of discrete elements of varying intensity representing said scanned image along said principal portion in accordance with information obtained from a programmed template of said predetermined image; and along the tracing direction, verifying tat the intensity of said elements along said first and second boundaries varies significantly from the intensity of said elements within said principal portion of said array of elements.

15. A scanned image verification apparatus according to claim 14, wherein said image recognition logic computes a score for said scanned image based on the number of said elements along first and second boundaries that vary significantly in intensity from the intensity of said elements within said principal portion of said array of elements.

16. A scanned image verification apparatus according to claim 13, wherein said elements are pixels.

17. A scanned image verification apparatus according to claim 16, wherein said pixels are stored in a gray scale format according to the pixel intensity.

18. A scanned image verification apparatus according to claim 13, wherein said image recognition logic selects a color plane to operate in prior to performing said analysis.

19. A scanned image verification apparatus according to claim 18, wherein said color plane is any one of a red, green and blue color plane.

20. A scanned image verification apparatus according to claim 13, wherein said illumination source further comprises light emitting diodes (LEDs).

21. A scanned image verification apparatus according to claim 13, wherein said image scanner comprises a charge coupled device.

22. A scanned image verification apparatus according to claim 13, wherein said image recognition logic logically verifies said scanned image by performing a bi-level separation of said scanned image and analyzing an area located outside of said scanned image area against said predetermined image area and background area.

23. A scanned image verification apparatus according to claim 22, wherein said bi-level separation of said scanned image and analysis further comprises:
  logically tracing a contour of said array of discrete elements of varying intensity representing said scanned image along a portion of said scanned image along a background area located outside of the area of said scanned image in accordance with information obtained from a programmed template of said predetermined image; and
  along the tracing direction, verifying that the number of background elements along said tracing contour is below a predetermined scoring threshold.

24. A card manufacturing apparatus for putting indicia on a card and verifying said indicia, comprising:
  a plurality of card processing modules arranged to produce a card with indicia disposed thereon; and at least one of said modules is an indicia verification module using a varying intensity scanned image of a portion of said card, the module comprising:
  an illumination source;
  an image scanner, scanning an image and converting said image illuminated by said illumination source into an electronically readable format;
  a storage device for storing said electronically readable scanned image in an array of discrete elements of varying intensity having first and second boundaries and a principal portion therebetween;
  a programmable template capable of storing a predetermined image in a separate portion of said storage device; and
  image recognition logic for verifying said scanned image against said predetermined image, wherein said image recognition logic logically verifies said scanned image by analyzing said array of discrete elements of varying intensity against said predetermined image and wherein said image recognition logic provides intensity normalization on each element prior to performing said analysis of said scanned image, the intensity normalization of each element being performed according to the following formula:

$$c = B + \frac{r-b}{w-b} \times (W-B)$$

where:
c is a normalized element intensity value;
r is the raw value;
B is a black output value;
W is a white output value;
b is a black input value; and
w is a white input value.

25. A card manufacturing apparatus according to claim 24 wherein at least one of said card manufacturing modules is an embosser.

26. A card manufacturing apparatus according to claim 24 wherein at least one of said card manufacturing modules is a printer.

27. A card manufacturing apparatus of claim 24 wherein at least one of said card manufacturing modules is a laser engraver.

28. A card manufacturing apparatus according to claim 24, wherein said analysis of said discrete elements of varying intensity further comprises:
  logically tracing the contour of said array of discrete elements of varying intensity representing said scanned image along said principal portion in accordance with information obtained from a programmed template of said predetermined image; and
  along the tracing direction, verifying that the intensity of said elements along said first and second boundaries varies significantly from the intensity of said elements within said principal portion of said array of elements.

29. A card manufacturing apparatus according to claim 24, wherein said elements are pixels.

30. The card manufacturing apparatus according to claim 29, wherein said pixels are stored in a gray scale format according to the pixel intensity.

31. The card manufacturing apparatus according to claim 24, wherein said image recognition logic selects a color plane in which to operate prior to performing said analysis.

32. The card manufacturing apparatus according to claim 31, wherein said color plane is any one of a red, green and blue color plane.

33. The card manufacturing apparatus according to claim 24, wherein said illumination source further comprises light emitting diodes (LEDs).

34. The card manufacturing apparatus according to claim 24, wherein said image scanner comprises a charge coupled device.

35. A card manufacturing apparatus according to claim 24, wherein said image recognition logic logically verifies said scanned image by performing a bi-level separation of said scanned image and analyzing an area located outside of said scanned image area against said predetermined image area and background area.

36. A card manufacturing apparatus according to claim 35, wherein said bi-level separation of said scanned image and analysis further comprises:
  logically tracing a contour of said array of discrete elements of varying intensity representing said scanned image along a portion of said scanned image along a background area located outside of the area of said scanned image in accordance with information obtained from a programmed template of said predetermined image; and
  along the tracing direction, verifying that the number of background elements along said tracing contour is below a predetermined scoring threshold.

37. A method for verifying a scanned image, said method comprising:
- scanning an image;
- converting said scanned image into an electronically readable format;
- storing said scanned image as an array of discrete elements of varying intensity;
- normalizing an intensity of each element prior to analyzing said image wherein said image intensity normalization is performed according to the following formula:

$$c = B + \frac{r-b}{w-b} \times (W-B)$$

where:
- c is a normalized element intensity value;
- r is the raw value;
- B is a black output value;
- W is a white output value;
- b is a black input value; and
- w is a white input value; and
- analyzing said array of discrete elements of varying intensity against a predetermined image to verify the scanned image.

38. A method according to claim 37 wherein said analysis of said discrete elements further comprises:
- logically tracing the contour of said array of discrete elements of varying intensity representing said scanned image along a principal portion of said array in accordance with information obtained from a programmed template of said predetermined image; and
- along the tracing direction, verifying that the intensity of said elements along said first and second boundaries varies significantly from the intensity of said elements within said principal portion of said array of elements.

39. A method according to claim 38 further comprising computing a score for said scanned image based on the number of said elements along said first and second boundaries that vary significantly in intensity from the intensity of said elements within said principal portion of said array of elements.

40. The method according to claim 37 further comprising selecting a color plane to operate in prior to performing said topological analysis.

41. The scanned image verification apparatus according to claim 40 wherein said color plane selecting step comprises selecting any one of a red, green and blue color plane.

42. A method according to claim 37, wherein said analysis of said discrete elements further comprises:
- logically verifying said scanned image by performing a bi-level separation of said scanned image and analyzing an area located outside of said scanned image area against said predetermined image area and background area.

43. A method according to claim 42, wherein said analysis of said discrete elements further comprises:
- logically tracing a contour of said array of discrete elements of varying intensity representing said scanned image along a portion of said scanned image along a background area located outside of the area of said scanned image in accordance with information obtained from a programmed template of said predetermined image; and
- along the tracing direction, verifying that the number of background elements along said tracing contour is below a predetermined scoring threshold.

* * * * *